imary Examiner—Lorraine T. Kendell
United States Patent [19]
Kageyama et al.

[11] 4,300,614
[45] Nov. 17, 1981

[54] PUNCTURE SEALANT FOR A TIRE

[75] Inventors: Kunio Kageyama; Shigeo Omote; Youichi Taguchi; Hazime Yamazaki, all of Kanagawa, Japan

[73] Assignee: The Yokohama Rubber Co., Ltd., Tokyo, Japan

[21] Appl. No.: 70,446

[22] Filed: Aug. 28, 1979

Related U.S. Application Data

[63] Continuation-in-part of Ser. No. 942,451, Sep. 14, 1978, abandoned.

[30] Foreign Application Priority Data

Sep. 14, 1977 [JP] Japan ................................. 52/109787

[51] Int. Cl.³ .................... B32B 25/04; B60C 1/00; B60C 17/00
[52] U.S. Cl. .................................. 152/347; 156/115; 428/355; 428/413; 428/492; 428/521; 428/522
[58] Field of Search ............... 152/346, 347; 156/115, 156/332, 334; 428/492, 355, 519, 520, 521, 522, 912, 413; 525/194, 208

[56] References Cited

U.S. PATENT DOCUMENTS

| | | | |
|---|---|---|---|
| 2,827,098 | 3/1958 | Semegen et al. | 152/347 |
| 3,758,635 | 9/1973 | Labana et al. | 525/208 |
| 4,038,454 | 7/1977 | Lehmann et al. | 428/355 X |

*Primary Examiner*—Lorraine T. Kendell
*Attorney, Agent, or Firm*—Finnegan, Henderson, Farabow, Garrett & Dunner

[57] ABSTRACT

A cured puncture sealant for a tire which comprises (1) either a copolymer of at least one acrylate selected from 2-ethylhexyl acrylate and n-butyl acrylate, and a glycidyl monomer, or a copolymer of at least one of the above acrylates, a glycidyl monomer, and at least one other acrylic monomer, and (2) a curing agent for epoxy resin. The sealant may optionally further include a polymer whose solubility parameter to the above copolymer is in the range of ±0.5. The sealant is most effective as a puncture sealant for a tubeless tire.

8 Claims, No Drawings

PUNCTURE SEALANT FOR A TIRE

CROSS REFERENCE TO RELATED APPLICATIONS

This application is a continuation-in-part of copending application Ser. No. 942,451, filed Sept. 14, 1978, now abandoned.

BACKGROUND OF THE INVENTION

The present invention relates to a puncture sealant for a rubber product such as a tire and, more particularly, to a cured puncture sealant for a tire, especially for a tubeless tire.

In general, it is said that a tubeless tire is relatively safe to puncture because when something like a nail has stuck in the tire, it is not easily removed and therefore a rapid loss of pressure does not occur. However, in practice, when driving a car having a tire punctured by a nail for a long time, especially at high speed, centrifugal force makes it easy to dislodge the nail, and once the nail is removed, a rapid air leak or puncture occurs and the car is in danger.

To prevent such danger, it is important to prevent a rapid air leak even if something like a nail is removed during operation of the tire. It has previously been proposed that a sealable composition be coated on the interior surface of a tire and cured, so that when the tire is punctured by something like a nail, the puncture is sealed at once to prevent an air leak and to maintain safe operation. For instance, as is shown in Japanese Pat. No. 324737, a sealant composition is applied on an interior liner of a tire during molding and is cured simultaneously when vulcanizing the tire; or after molding a tire, a sealant composition is coated on an interior surface by means of a spray.

The former technique has the disadvantages that the production is difficult and the balance of the tire after molding is not so good. In the latter technique, as is shown in U.S. Pat. No. 3,935,893, a large amount of solvent such as toluene must be used to lower the viscosity of rubbery material for making its spraying possible, because the rubbery material has a high molecular weight and, even if a relatively low molecular weight and low viscosity material such as polybutene is used together with it, it is impossible to lower the viscosity to the range capable of being sprayed.

Further, in such techniques, non-curing type sealants composed of polybutene and rubbery components have been proposed. However, these non-curing type sealants have the disadvantage that when the tire to which they have been applied is operated for a long time at high speed, the temperature is elevated and the sealant gradually moves to a center part of the tire to cause roughness thereon and, as a result, the balance of the tire becomes distorted and the sealing effect can not be obtained except at an isolated location. Moreover, these sealants have the disadvantage that when the tire is damaged by something like a nail during operation at a high temperature, the sealant having a lowered viscosity flows out through the leak to lower the sealing property. Also, adhesives using acrylic compounds have been proposed but their viscosity and sealing property are insufficient for a sealant to be applied on the interior surface of the tire.

SUMMARY OF THE INVENTION

An object of the present invention is to overcome the above-mentioned disadvantages of conventional puncture sealants.

Another object of the present invention is to provide a puncture sealant for a rubber product such as a tire which exhibits excellent sealing properties when applied to the interior surface of a tire such as a tubeless tire as a puncture-preventing layer and excellent processability during its application, does not become fluid even when operating the tire for a long time at an elevated temperature, and exhibits excellent sealing properties at low and high temperatures.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the cured puncture sealant of the invention comprises (a) a copolymer of at least one acrylate selected from the group consisting of 2-ethylhexyl acrylate and n-butyl acrylate, and at least one glycidyl monomer; or a copolymer of at least one above acrylate, at least one glycidyl monomer, and at least one other acrylate having no epoxy group, and (b) a curing agent for epoxy resin. The sealant may optionally further include (c) a polymer whose solubility parameter to the above copolymer is within ±0.5.

In the present invention, a sealing composition having the above-mentioned components is applied on a surface to be sealed and then cured to form a sealant. The sealant preferably exhibits an elongation at break of 500–2000% and a tensile strength of 0.7–5.0 kg/cm$^2$.

The sealant having the specific acrylic polymer of the present invention is highly effective in preventing damage to the tire caused by something like a nail.

The sealant of the present invention can quickly respond to a gash caused by a nail and quickly seal the gash portion without flowing out through the gash. Because the sealant has a high viscosity and not only has high cohesion and adhesion to the tire but also has strong tackiness to a nail, when the nail is removed, the sealant applied on the interior surface of the tire flows into the leak caused by the nail to completely seal it.

The sealant of the present invention has high thermal stability and therefore does not flow out through a leak caused in a tire even at high operating temperatures. It also has high adhesion to the inner liner of the tire and therefore can be easily applied onto the interior surface of the tire without any special means such as an adhesive agent.

Moreover, the sealant of the present invention has a low secondary transition temperature and does not become brittle even at −40° C. or less. The sealant of the present invention mainly composed of acrylic polymer has excellent weather resistance, ozone resistance, and oxidation resistance and can be used for a long period of time. As indicated above, it exhibits excellent sealing properties from very low temperatures to high temperatures. In other words, poly-2-ethylhexyl acrylate and poly-butyl acrylate have low glass transition temperatures of from −80° C. to −60° C. and therefore can yield a low-temperature resistant sealant and a highly adhesive sealant.

DESCRIPTION OF THE PREFERRED EMBODIMENTS

Reference will now be made in detail to the presently preferred embodiments of the invention.

The preferred glycidyl monomers that may be used in the sealant of the present invention include glycidyl methacrylate, glycidyl acrylate, allyl glycidyl ether, and the like. Among them, glycidyl methacrylate is most preferred. The amount of the glycidyl monomer to be copolymerized is preferably 0.5–5 parts by weight to 100 parts by weight of the total amount of 2-ethylhexyl acrylate and n-butyl acrylate. With less than 0.5 part by weight of the glycidyl monomer, the sealant is liable to become fluid when the tire is operated at high temperatures, and with more than 5 parts by weight, the sealant becomes hard after curing and the sealing property is lowered. It is more preferably used within the range of 0.8–3 parts by weight. In other words, the amount of epoxy group contained in the copolymer of 2-ethylhexyl acrylate and/or n-butyl acrylate and the glycidyl monomer is preferably within the range of from 0.057 meq/g to 0.208 meq/g, calculated in terms of epoxy value.

The curing agent in the sealant of the present invention is added into the above-mentioned copolymer of 2-ethylhexyl acrylate and/or n-butyl acrylate and the glycidyl monomer and cures it at a temperature of from room temperature to 160° C. to impart thermal stability.

As the curing agent, various curing agents available for epoxy resin may be used. For example, amines, acid anhydrides, organic polymers such as polyamides, polysulfides, and polyacrylic acid, boron trifluoride complex, inorganic acids such as phosphorus acid and the like may be used. As the amines, diethylene triamine, triethylene tetramine, tetraethylene pentamine, diethylamino propylamino, amino ethyl piperadine, dimethylamino propylamine, 2, 4,6-tris (dimethylaminomethyl) phenol, piperidine, dimethylamino diphenylamino methylol phenol, diamino diphenyl methane, diamino diphenyl sulfone, diamino diphenyl ether, metaphenylene diamine and the like are preferably used. As the acid anhydrides, phthalic anhydride, hexahydrophthalic anhydride, methylnadic anhydride, pyromellitic anhydride, maleic anhydride and the like are preferably used. The amount of the curing agent to be blended is an amount sufficient to cure the epoxy groups contained in the abovementioned copolymer and preferably within 0.5 to 5 parts by weight to 100 parts by weight of the above-mentioned copolymer.

Moreover, in the sealant of the present invention, in order to raise the strength at break or the tensile strength, if necessary, acrylic monomers other than 2-ethylhexyl acrylate and n-butyl acrylate having no epoxy group can be used as comonomer(s) in the copolymerization of 2-ethylhexyl acrylate and/or n-butyl acrylate and the glycidyl monomer. As the other acrylate having no epoxy group, ethyl acrylate, methyl acrylate, methyl methacrylate, ethyl methacrylate, n-butyl methacrylate, isobutyl acrylate, isobutyl methacrylate, hexyl methacrylate, t-butyl acrylate, cyclohexyl acrylate, cyclohexyl methacrylate, n-octyl acrylate, n-octyl methacrylate, dodecyl acrylate, dodecyl methacrylate, phenyl acrylate, phenyl methacrylate, lauryl acrylate, lauryl methacrylate, cetyl acrylate, cetyl methacrylate, tetrahydrofurfuryl methacrylate, benzyl methacrylate and the like can be used. Among them, ethyl acrylate and cetyl acrylate are more preferable. The amount of such other acrylate is preferably less than 25 parts by weight to 100 parts by weight of the total amount of 2-ethylhexyl acrylate and n-butyl acrylate. With amounts over 25 parts by weight, sufficient low-temperature resistance cannot be obtained.

In the sealant component of the present invention, if necessary, in order to raise the elongation at break, a polymer having a solubility parameter to the copolymer of within ±0.5 can be blended into the copolymer. As the polymers for this purpose, acrylic polymers such as homopolymers or copolymers of 2-ethylhexyl acrylate, n-butyl acrylate, ethyl acrylate, methyl acrylate, methyl methacrylate, ethyl methacrylate, n-butyl methacrylate, isobutyl acrylate, isobutyl methacrylate, hexyl methacrylate, t-butyl acrylate, cyclohexyl acrylate, cyclohexyl methacrylate, octyl acrylate, octyl methacrylate, dodecyl acrylate, dodecyl methacrylate, phenyl acrylate phenyl methacrylate, lauryl methacrylate, lauryl acrylate, cetyl methacrylate, tetrahydrofurfuryl methacrylate and benzyl methacrylate, with a molecular weight from an oligomer of a hundred or more to a high polymer of ten million or more, or natural rubber, isoprene rubber, styrene-butadiene rubber, polysulfide rubber, nitrilebutadiene rubber having a low nitrile content, indene, or conventional acryl rubber are preferably used. Such polymers may be preferably used in the range of less than 200 parts by weight to 100 parts by weight of the above-mentioned copolymer. With over 200 parts by weight, fluidity of the sealant composition becomes rather high and when applied onto the interior surface of the tire, it is liable to become fluid.

These polymers have no epoxy group in their molecules and therefore are not affected by the curing agent and act as polymer plasticizers to impart suitable elongation and viscosity to the sealant: therefore, when the polymer is blended into the copolymer, the sealant obtained shows an improved sealing property. Into the sealant of the present invention, if necessary, various additives or fillers may be blended. For example, silica, alumina, talc, zinc oxide, titanium oxide, carbon black, rubber powder, glass powder, glass fiber, activated clay, carbon fiber, organic fiber, pigment, dyestuff and the like are preferable additives.

These additives can impart various advantages such as flow resistance, reinforcement, thermal stability or coloring to the sealant. In case of blending fillers such as silica, talc, or bentonite into the sealant, it exhibits thixotropy, and when the sealant is applied onto the interior surface of the tire by spraying, etc., flow resistance can be improved.

In applying the sealant composition of the present invention onto the interior surface of a tire, the above-mentioned copolymer may be blended with the curing agent for epoxy resin and the other additives, and heated at above 150° C. to be sprayed, the so-called one-liquid method. More preferably, the copolymer containing epoxy groups therein and the mixture of the polymer containing no epoxy group therein, whose solubility parameter to the above copolymer is within ±0.5 and suitable additives may be separately prepared, and the curing agent for epoxy resin may be added into the latter mixture, and the two kinds of liquids thus obtained are mixed immediately before being sprayed, the so-called two-liquid method. The latter two-liquid method is more effective than the former method in obtaining satisfactory performance of the curing agent for epoxy resin and a wider-range selectivity of temperature for spraying the sealant.

In the following discussion, the two-liquid method is explained in detail. First, the following copolymer is prepared:

| Monomers for the copolymer | parts by weight |
|---|---|
| 2-ethylhexyl acrylate and/or n-butyl acrylate | 100 |
| Glycidyl monomer | 0.5–5 |
| Other acrylic monomer | 0–25 |

Into the above mixture, with or without solvent, 0.05–5 parts by weight of a polymerization catalyst such as benzoyl peroxide or azobisisobutyronitrile is added and the polymerization reaction is conducted at 50°–80° C. to obtain a copolymer. Then the polymer having no epoxy group whose solubility parameter to the above copolymer is within ±0.5 is prepared. Into the polymer, a predetermined amount of curing agent for epoxy resin is added and stirred to obtain a mixture. Other additives such as talc, clay or pigment are added either into the copolymer or the mixture. Then both of them are mixed at an elevated temperature when spraying and sprayed onto the interior surface of the tire and cured. In such a two-liquid mixing method, any kinds of curing agents, regardless of their curing rates, may be used without any trouble in their storage or other steps.

When spraying the sealant composition of the present invention, both of the above components are heated at a temperature sufficient to obtain a suitable viscosity and sprayed onto the interior surface of the tire rotating at 30–60 r.p.m.. In this case, the sealant composition may be widely applied onto tires of different size by optionally selecting the size and position of spray nozzle. The sealant composition may also be coated and set not only at the crown part but also up to the shoulder part, since it is not fluid after the application. Consequently, the excellent sealing properties may be exhibited in wide areas. When spraying, no adhesive agent need be applied to the interior surface of the tire, but the interior surface is preferably washed before spraying to remove releasing agent used during vulcanization of the tire.

The copolymers to be used in the present invention are, before curing, preferably liquids of more than 100,000 centipoise in viscosity at 25° C. The copolymers have a high-temperature sensitive property, and the viscosity can be reduced to a value within a range of from a few hundred centipoise to a few ten-thousand centipoise by heating at a temperature of about 150° C. to make a high-pressure spraying operation possible. The preferable copolymers have a viscosity of more than 500,000 centipoise at 25° C. and of less than 50,000 centipoise at 150° C. (measured by means of a Brookfield type rotary viscometer).

The sealant composition of the present invention is converted to a highly sticky sealant having an elongation at break of 500–2000% and a tensile strength of 0.7–5.0 kg/cm$^2$ after being sprayed and cured on the interior surface of a tire and shows excellent sealing properties even when the tire suffers from a nail puncture.

The present invention is further explained in detail by the following nonlimiting Examples, in which parts means parts by weight.

EXAMPLE 1

To 100 parts of 2-ethylhexyl acrylate, glycidyl methacrylate was mixed in the ratio shown in Table 1 and 0.5 parts of benzoyl peroxide was added thereto and the bulk polymerization was carried out at 70° C. to obtain a copolymer.

TABLE 1

| Component | Run No. | | | | | | | |
|---|---|---|---|---|---|---|---|---|
| | 1 | 2 | 3 | 4 | 5 | 6 | 7 | 8 |
| 2-ethylhexyl acrylate (parts) | 100 | 100 | 100 | 100 | 100 | 100 | 100 | 100 |
| glycidyl methacrylate (parts) | 0.5 | 0.8 | 1.0 | 2 | 2.5 | 3 | 4 | 5 |
| benzoyl peroxide (parts) | 0.5 | 0.5 | 0.5 | 0.5 | 0.5 | 0.5 | 0.5 | 0.5 |
| viscosity of copolymer (25° C.) (cps) | 700,000 | 900,000 | 700,000 | 700,000 | 750,000 | 850,000 | 1,000,000 | 1,000,000 |
| viscosity of copolymer (150° C.) (cps) | 650 | 900 | 650 | 650 | 840 | 880 | 1,300 | 1,300 |
| epoxy value (meq/g) | 0.034 | 0.055 | 0.069 | 0.136 | 0.171 | 0.204 | 0.269 | 0.333 |

That is, into a 3-necked separable flask equipped with a condenser, stirrer, and thermometer, the components shown above were poured, and bulk polymerization was conducted while stirring on a water bath controlled at 70° C. The polymerization reaction was initiated after 2–3 hours. After initiation of the polymerization, the stirring was continued for 3 hours and then the contents were taken out and aged in an oven at 120° C. for 5 hours. The copolymer thus obtained was a pale yellowish transparent viscous liquid.

From the measurement of molecular weight distribution by means of G.P.C., it became clear that the copolymer contained a range from an oligomer having a molecular weight of about 2,000 to a super high polymer having a molecular weight of about 2,000,000 and the viscosity was 700,000 to 1,000,000 centipoise at 25° C. To 100 parts of the resulting copolymer, 2 parts of 2,4-6-tris (dimethylamino methyl) phenol was added and the mixture was sufficiently stirred and cast on a releasing paper to make a sheet 3 mm thick. The sheet was only partially cured at 80° C. for 1 hour and applied to the interior surface of a tire, and the sealing property at nail sticking (note 1), the sealing property at cold (note 2), the sealing property at hot (note 3), and the fluidity (note 4) were measured.

On the other hand, a sample of Danbel type in JIS No. 3 was prepared and the characteristics were measured. The results are shown in Table 2.

TABLE 2

| Testing item | Run No. | | | | | | | |
|---|---|---|---|---|---|---|---|---|
| | 1 | 2 | 3 | 4 | 5 | 6 | 7 | 8 |
| 300% modulus (kg/cm$^2$) | 0.1 | 0.1 | 0.1 | 0.1 | 0.2 | 0.2 | 0.4 | 0.5 |

TABLE 2-continued

| Testing item | Run No. | | | | | | | |
|---|---|---|---|---|---|---|---|---|
| | 1 | 2 | 3 | 4 | 5 | 6 | 7 | 8 |
| 500% modulus (kg/cm$^2$) | 0.5 | 0.5 | 0.5 | 0.6 | 0.8 | 0.9 | 1.4 | 1.6 |
| tensile strength (kg/cm$^2$) | 0.7 | 0.8 | 0.7 | 0.7 | 1.3 | 1.5 | 2.0 | 2.0 |
| elongation at break (%) | 1100 | 1000 | 950 | 900 | 850 | 600 | 500 | 500 |
| sealing property at nail sticking (%) | 100 | 100 | 100 | 100 | 100 | 100 | 100 | 100 |
| sealing property at cold (%) | 100 | 100 | 100 | 100 | 100 | 100 | 95 | 80 |
| sealing property at hot (%) | 70 | 85 | 90 | 85 | 95 | 95 | 95 | 95 |
| fluidity (80° C. - 80 km/h) | bad | good | good | good | good | good | good | good |

(Note 1) Sealing property at nail sticking: 40 pieces of nails, each of which is 6 mm in diameter and 7 cm in length, are stuck in the tread portion of a tire that has been rimmed under 2.0 kg/cm$^2$ of inner pressure (tire size 165 SR-13) and immediately pulled out. The number of punctures through which air does not leak at that time is shown in proportion to the number of total punctures, i.e. 40.

(Note 2) Sealing property at cold: 40 pieces of nails, each of which is 3 mm in diameter, are stuck on the circumference of a rimmed tire, the tire is chilled by leaving it at −40° C. for 4 hours, and immediately the nails are pulled out. The number of punctures through which air does not leak at that time is shown in proportion to the number of total punctures, i.e. 40.

(Note 3) Sealing property at hot: After leaving the tire at 100° C. for 4 hours, the proportion of punctures through which air does not leak is shown in accordance with Note 2.

(Note 4) Fluidity: Onto a turntable, a rubber sheet on which a sealant 3 mm thick and 20 mm wide is applied is set, and the turntable is rotated for 1 hour and checked for whether or not the sealant becomes fluid under centrifugal force. The rotation speed of the turntable is adjusted so that the centrifugal force given to the shoulder portion of the tire caused by the operation speed of the tire is the same as the centrifugal force given to the sealant on the turntable. The operation speed of the tire at that time and the temperature of the environment where the tire is set are shown in Table 2. When no movement of the sealant is observed, the result is shown as "good" and when movement is observed, the result is shown as "bad."

As is shown in Table 2, as the ratio of glycidyl methacrylate increases, the sealing property tends to somewhat lower because the hardness of the cured sealant increases somewhat and the elongation lowers. In this example, when the ratio of glycidyl methacrylate was less than 3 parts, preferable results were obtained.

EXAMPLE 2

According to the manner set forth in Example 1, a copolymer of n-butyl acrylate and glycidyl methacrylate was obtained, and the following compositions were prepared.

In Table 3, the component ratios, viscosity, and epoxy value of the copolymer are shown.

TABLE 3

| Component | Run No. | | | | | |
|---|---|---|---|---|---|---|
| | 9 | 10 | 11 | 12 | 13 | 14 |
| n-butyl acrylate (parts) | 100 | 100 | 100 | 100 | 100 | 100 |
| glycidyl methacrylate (parts) | 0.5 | 1.0 | 2 | 2.5 | 3 | 4 |
| azobis isobutylonitrile (parts) | 0.5 | 0.5 | 0.5 | 0.5 | 0.5 | 0.5 |
| viscosity of copolymer (25° C.) (cps) | 700,000 | 2,000,000 | 700,000 | 750,000 | 8,50,000 | 950,000 |
| viscosity of copolymer (150° C.) (cps) | 9,000 | 25,000 | 9,200 | 9,500 | 11,000 | 13,000 |
| epoxy value (meq/g) | 0.034 | 0.069 | 0.136 | 0.170 | 0.204 | 0.269 |

The copolymer aged for 5 hours at 120° C. was a transparent viscous liquid and a mixed system having molecular weights of 500 to 10,000,000. The viscosity at 25° C. was from 700,000 to 2,000,000 centipoise.

Into 100 parts of the resulting copolymer, 3 parts of "Barsamide" 115 (note 5) was mixed to obtain a composition. According to the manner set forth in Example 1, the composition was cast and cured at 100° C. for 2 hours. The sealing properties and the characteristics in elongation and strength are shown in Table 4.

(Note 5) "Barsamide" 115 is a polyamide resin manufactured by Generalmill Corp.

TABLE 4

| Testing item | Run No. | | | | | |
|---|---|---|---|---|---|---|
| | 9 | 10 | 11 | 12 | 13 | 14 |
| 300% modulus (kg/cm$^2$) | 0.1 | 0.1 | 0.2 | 0.3 | 0.4 | 0.6 |
| 500% modulus (kg/cm$^2$) | 0.4 | 0.6 | 0.6 | 0.9 | 0.9 | 1.7 |
| tensile strength (kg/cm$^2$) | 0.4 | 1.0 | 0.9 | 1.5 | 1.7 | 2.0 |
| elongation at break (%) | 900 | 800 | 900 | 800 | 560 | 500 |
| sealing property at nail sticking (%) | 100 | 100 | 100 | 100 | 100 | 100 |
| sealing property at cold (%) | 90 | 90 | 100 | 100 | 95 | 80 |
| sealing property at hot (%) | 70 | 90 | 90 | 95 | 95 | 95 |
| fluidity (80° C. - 80 km/h) | good | good | good | good | good | good |

As is clear from Table 4, the greater the epoxy content, the lower the sealing property at cold, but excellent effects were obtained as a whole. When the amount of glycidyl methacrylate was 0.5 part, the sealing property at hot and the fluidity were not so good.

EXAMPLE 3

According to Table 5, the monomers were copolymerized in ethyl acetate to obtain the corresponding copolymer.

TABLE 5

| Component | Run No. 15 | 16 | 17 |
|---|---|---|---|
| 2-ethylhexyl acrylate (parts) | 100 | — | 100 |
| n-butyl acrylate (parts) | — | 100 | — |
| glycidyl methacrylate (parts) | 2.5 | 2.5 | 1.3 |
| benzoyl peroxide (parts) | 0.5 | 0.5 | 0.2 |
| ethyl acetate (parts) | 400 | 400 | 153 |
| reaction time (hrs.) | 7 | 7 | 9 |
| viscosity of copolymer (25° C.) (cps) | 500,000 | 800,000 | above 2,000,000 |
| viscosity of copolymer (150° C.) (cps) | 760 | 10,000 | 47,000 |
| epoxy value (meq/g) | 0.171 | 0.171 | 0.090 |

Using a 3-necked flask equipped with a condenser, a thermometer and a stirrer, the copolymerization reaction was conducted on a water bath at 80° C. After the reaction, the residual monomers and the solvent were removed from the mixture by means of an evaporator at 60° C. The product was aged in an oven for 3 hours to obtain a viscous and transparent copolymer.

The copolymer was a mixture having a molecular weight of more than 500 and had a sharp molecular weight distribution in comparison with the cases of bulk polymerization in Examples 1 and 2.

Into the copolymers (15), (16), and (17), various kinds of curing agents were added according to Table 6 and heated to cure.

TABLE 6

| Component | Run No. 18 | 19 | 20 | 21 | 22 | 23 | 24 |
|---|---|---|---|---|---|---|---|
| copolymer No. 15 (parts) | 100 | 100 | 100 | | | | |
| copolymer No. 16 (parts) | | | | 100 | 100 | 100 | |
| copolymer No. 17 (parts) | | | | | | | 100 |
| triethylene tetramine (parts) | 1 | | | | | | |
| "Barsamide" 115 (parts) | | 2 | | | | | 2 |
| 2,4,6-tris (dimethylamino-methyl) phenol (parts) | | | 1 | | | | |
| phthalic anhydride (parts) | | | | | 2 | | |
| "epomate" PX-3 (Note 6) (parts) | | | | 1 | | | |
| diethyl amino propyl amine (parts) | | | | | | 1 | |
| curing temperature (°C.) | 120 | 120 | 120 | 160 | 120 | 120 | 150 |
| curing time (min.) | 30 | 60 | 60 | 30 | 30 | 60 | 10 |

(Note 6) "epomate" PX-3: a curing agent for epoxy resin manufactured by Mitsubishi Petrochemical Co., Ltd.

The sealant sheet 3 mm thick obtained was applied onto the interior surface of a tire and the mechanical characteristics and the sealing properties were measured in accordance with Example 1.

The results are shown in Table 7.

TABLE 7

| Testing item | Run No. 18 | 19 | 20 | 21 | 22 | 23 | 24 |
|---|---|---|---|---|---|---|---|
| 300% modulus (kg/cm$^2$) | 0.5 | 0.5 | 0.3 | 0.7 | 0.2 | 0.2 | 0.2 |
| 500% modulus (kg/cm$^2$) | 1.2 | 1.3 | 1.5 | 1.7 | 1.0 | 1.0 | 0.5 |
| tensile strength (kg/cm$^2$) | 1.2 | 1.7 | 2.2 | 2.0 | 1.5 | 1.3 | 2.3 |
| elongation at break (%) | 510 | 950 | 800 | 670 | 700 | 710 | 875 |
| sealing property at nail sticking (%) | 100 | 100 | 100 | 100 | 100 | 100 | 100 |
| sealing property at cold (%) | 75 | 100 | 95 | 80 | 85 | 90 | 95 |
| sealing property at hot (%) | 80 | 95 | 100 | 90 | 95 | 90 | 90 |
| fluidity (80° C. - 80 km/h) | good | good | good | good | good | good | good |

EXAMPLE 4

According to Table 8, a polymerization reaction was conducted in ethyl acetate at a reflux temperature to obtain the corresponding copolymer.

TABLE 8

| component of copolymer | Run No. 25 | 26 | 27 | 28 |
|---|---|---|---|---|
| 2-ethylhexyl acrylate (parts) | 100 | | 100 | 100 |
| n-butyl acrylate (parts) | 20 | 100 | | |
| ethyl acrylate (parts) | | 10 | | |
| cetyl acrylate (parts) | | | 10 | |
| glycidyl methacrylate (parts) | 2.5 | 2.5 | 2.5 | 1.3 |
| benzoyl peroxide (parts) | 0.5 | 0.5 | 0.5 | 0.5 |
| reaction time (hrs.) | 8 | 10 | 10 | 10 |
| reaction temperature (°C.) | 77 | 77 | 77 | 77 |
| viscosity of copolymer (25° C.) (cps) | 1,000,000 | >2,000,000 | >2,000,000 | >2,000,000 |
| viscosity of copolymer (150° C.) (cps) | 14,000 | 33,000 | 48,000 | 9,000 |
| epoxy value (meq/g) | 0.171 | 0.169 | 0.170 | 0.090 |

After the reaction, ethyl acetate was distilled out by heating the mixture in an evaporator and the product was aged in an oven at 120° C. for 3 hours.

The copolymers in Run Nos. 25-28 were transparent viscous liquids having molecular weights of 500-800,000.

Next, according to the following description, an acrylic composition having no epoxy group was prepared.

Into 70 parts of ethyl acetate, 30 parts of 2-ethylhexyl acrylate and/or n-butyl acrylate was added to form a solution, and benzoyl peroxide in an amount of 0.5 part based on 100 parts of 2-ethylhexyl acrylate and/or n-butyl acrylate was added thereto, and then the polymerization reaction was conducted at 80° C. for 10 hours on a water bath. After distilling out ethyl acetate from the resulting viscous liquid, the product was aged at 120° C. for 5 hours. The aged product was a transparent viscous liquid containing a homopolymer having a molecular weight of 500-800,000.

Into the polymer, a curing agent for epoxy resin and components shown in Table 9 were mixed by paintmill and four kinds of compositions were obtained.

TABLE 9

| Component of composition | Run No. | | | |
|---|---|---|---|---|
| | 29 | 30 | 31 | 32 |
| poly-2-ethylhexylacrylate (parts) | 100 | | 100 | 100 |
| poly-n-butyl acrylate (parts) | | 100 | | |
| NBR (nitrile contents 33%) (parts) | 4 | | | |
| acryl rubber (note 7) (parts) | 10 | | | |
| "Barsamide" 115 (parts) | | | 8 | 3 |
| "epomate" PX-3 (parts) | 5 | 5 | | |
| titanium oxide (parts) | | | | 8 |
| talc (parts) | | | | 9 |

(Note 7)
acryl rubber: Hycar 4021, manufactured by B. F. Goodrich Chem.

The above copolymers and the above compositions were mixed in the ratio shown in Table 10.

The compositions thus obtained were cast into sheets 3 mm thick, heated at 120° C. for 30 minutes, and left at a room temperature for 3 days to cure.

The various characteristics thereof are shown in Table 10.

TABLE 10

| | Run No. | | | | | | |
|---|---|---|---|---|---|---|---|
| | 33 | 34 | 35 | 36 | 37 | 38 | 39 |
| copolymer No. 25 (parts) | 100 | 100 | | | | | |
| copolymer No. 26 (parts) | | | 100 | 100 | | | |
| copolymer No. 27 | | | | | 100 | | |
| copolymer No. 28 (parts) | | | | | | 100 | 100 |
| composition No. 29 (parts) | 20 | 100 | | 20 | 200 | | |
| composition No. 30 (parts) | | | 100 | | | | |
| composition No. 31 (parts) | | | | | | 25 | |
| composition No. 32 (parts) | | | | | | | 180 |
| 300% modulus (kg/cm$^2$) | 0.1 | 0.1 | 0.1 | 0.2 | 0.1 | 0.1 | 0.2 |
| 500% modulus (kg/cm$^2$) | 0.3 | 0.2 | 0.2 | 1.3 | 0.2 | 0.1 | 0.4 |
| tensile strength (kg/cm$^2$) | 3.0 | 2.5 | 1.8 | 4.5 | 1.0 | 3.0 | 1.6 |
| elongation at break (%) | 1200 | 1650 | 2000 | 970 | 1600 | 1350 | 1500 |
| sealing property at nail sticking (%) | 100 | 100 | 100 | 100 | 100 | 100 | 100 |
| sealing property at cold (%) | 100 | 100 | 100 | 95 | 100 | 100 | 100 |
| sealing property at hot (%) | 95 | 90 | 85 | 95 | 80 | 95 | 85 |
| fluidity (80° C. - 80 km/h) | good | good | good | good | good | good | good |

EXAMPLE 5

Into a solution of ethyl acetate and acrylic monomers in which the concentration of the acrylic monomers was 40% by weight, 0.5 parts by weight of benzoyl peroxide, based on 100 parts of the acrylic monomer, was added and the solution was poured into a 3-necked flask equipped with a condenser, a thermometer, and a stirrer and heated at 80° C. for 10 hours on a water bath to be copolymerized.

After the copolymerization, ethyl acetate was eliminated and the remaining product was aged at 120° C. for 5 hours to obtain a copolymer having no epoxy group and a polymer having no epoxy group. Into the resulting products, other polymers and additives were added to prepare compositions (1) and (2) of Table 11, respectively.

The compositions were sprayed in accordance with Table 11 onto the interior surface of a tire at 150° C. to obtain coating layers of about 3 mm thick.

After standing for 3 days, the characteristics of the sealants were measured. The results are shown in Table 11.

TABLE 11

| | | Run No. | | |
|---|---|---|---|---|
| | | 40 | 41 | 42 |
| Composition (1) | | | | |
| (copolymer) | 2-ethylhexyl acrylate (parts) | 75 | 89 | 98 |
| | ethyl acrylate (parts) | 23 | — | — |
| | glycidyl acrylate (parts) | 2 | 2 | 2 |
| epoxy value of copolymer meq/g | | 0.136 | 0.132 | 0.139 |
| viscosity of copolymer (25° C.) cps | | 500,000 | 2,000,000 | 2,000,000 |
| viscosity of copolymer (150° C.) cps | | 6,000 | 4,300 | 3,000 |
| (additive) | talc (parts) | — | 9 | — |
| | [total weight of composition (1)] | [100] | [100] | [100] |
| Composition (2) | | | | |
| (polymer) | 2-ethylhexyl acrylate (parts) | 70 | 20 | 12 |
| | ethyl acrylate (parts) | 21 | — | — |

TABLE 11-continued

|  |  | Run No. 40 | Run No. 41 | Run No. 42 |
|---|---|---|---|---|
| (additives) | titanium oxide (parts) | — | 1.0 | 1.6 |
|  | pigment (parts) | — | 0.5 | — |
|  | 2,4,6-tris (dimethylaminomethyl) phenol (parts) | 3.4 | — | — |
|  | "Barsamide" 115 (parts) | — | 3.5 | 4.4 |
|  | NBR (nitrile content 33%) (parts) | 5.6 | — | 3 |
|  | Hycar 4021 (parts) | — | — | 4 |
| [total weight of composition (2)] |  | [100] | [25] | [25] |
| ratio of compositions (1) and (2), when sprayed |  | (1:1) | (4:1) | (4:1) |
| Characteristics |  |  |  |  |
| sealing property at nail sticking (%) |  | 100 | 100 | 100 |
| sealing property at cold (%) |  | 100 | 100 | 100 |
| sealing property at hot (%) |  | 95 | 95 | 95 |

Three kinds of the tires (165 SR 13) thus obtained were rimmed and given an inner pressure of 2.0 kg/cm². In each 20 pieces of nails (2.8 mm in diameter, 6.5 mm in length) were stuck into the crown and shoulder portions and the tires were set on a steel drum and operated at a speed of 80 km/h for 2 hours at first and then at 128 km/h for 30 minutes, and thereafter the operation speed was increased 8 km/h every 30 minutes. All the nails were removed from the tires by centrifugal force at a speed within the range of 130–160 km/h. The drum test was stopped immediately after all the nails were removed and the inner pressure of the tire was measured. All the tires were free of pressure drop. The rims were taken down and the sealants were observed. All the sealants had not moved and excellent results were obtained.

Control Test 100 parts of 2-ethylhexyl acrylate, 100 parts of ethyl acrylate, 4 parts of glycidyl methacrylate and 200 parts of ethyl acetate were poured into a 3-necked flask equipped with a condenser, 0.2 parts of benzoyl peroxide were added thereto, and then they were reacted at 77° C. for 10 hours to obtain a solution of ethyl acetate containing an acrylic copolymer. Into 100 parts of the solution 1 part of 2,4,6-tris (dimethylaminomethyl) phenol was added, the resulting solution was cast, ethyl acetate was removed therefrom, and a film 1 mm thick was obtained by heating at 150° C. for 10 minutes. The film had a tensile strength of 12 kg/cm² and an elongation at break of 280%.

On the other hand, the same composition was cast to obtain a film of 3 mm thick and it was applied onto the interior surface of a tire, which was punctured with nails. The sealing properties were remarkably bad.

The acrylic copolymer resulting from removing ethyl acetate from the composition was rigid and hard, and the viscosity was not significantly lowered even when heated at 150° C.

EXAMPLE 6

According to the presently most preferred embodiment:

Component (A) is a copolymer of 100 parts by weight of 2-ethylhexyl acrylate and 2 parts by weight of glycidyl methacrylate. Component (B), which functions as a curing agent, consists of 5 parts by weight of an amine, preferably 2, 4, 6, tris (dimethylaminomethyl) phenol, dissolved in 29 parts by weight of 2-ethylhexyl acrylate polymer and 6 parts by weight of inorganic additives, such as carbon black, titanium oxide, and pigment. Component (A) is heated to 160° C., and 100 parts by weight of the heated copolymer are mixed with 50 parts by weight of component (B) that have been heated to 100° C. The mixture is then sprayed at an elevated temperature onto the interior surface of a tire to obtain a coating of about 3 mm. in thickness. Extenders that may be used to lower the cost of components (A) and (B) are inactive polymers such as NBR and polybutene. The resulting product is an improved combination including a tire and a cured puncture sealant layer on the inner surface of the tire.

Finally, the advantages of the present invention are summarized.

The composition of the present invention is a liquid polymeric material having good temperature sensitivity and therefore it can be sprayed without a solvent by heating. Also, in the present invention, the composition (I) which contains a copolymer having an epoxy group as a main component and the composition (II) which contains a copolymer having no epoxy group as a main component can be blended with a curing agent prior to the application onto a tire. In this case, if the curing agent is previously added into the composition (II) and both of the components (I) and (II) are mixed immediately before the application, excellent processabilities can be obtained.

Both of the components may be of completely non-solvent type and, accordingly, the sealant of the present invention has no such defect as solvent loss, toxicity, flammability, pollution and the like.

The mechanical properties of the sealant after curing can be optionally controlled by changing the type and amount of polymer component therein, the type and amount of acrylic monomer therein and the like, and, accordingly, sealants having various mechanical properties can be obtained.

In other words, in respect to tensile strength, one of from 0.7 kg/cm² to 5.0 kg/cm² can be obtained at will, and in respect to elongation at break, one of up to 2000% can be obtained. Therefore, in the case of using the composition as the puncture sealant for a tire, an excellent sealant tire can be prepared by selecting one having a tensile strength of 0.7–35 kg/cm² and an elongation at break of more than 800%.

Moreover, the main components of the composition of the present invention are 2-ethylhexyl acrylate and n-butyl acrylate, and therefore it exhibits excellent low-temperature resistance and does not become rigid at low temperature while the sealing property is excellent.

Furthermore, the acrylic polymers that are basic components are transparent and, accordingly, the sealant can be variously colored by adding a small amount of pigment, which can upgrade the tire.

It will be apparent to those skilled in the art that various modifications and variations could be made in the sealant of the invention without departing from the scope of the invention.

What we claim is:

1. In a combination of a tire and a cured puncture sealant layer on an inner surface of said tire, the improvement comprising:

said cured puncture sealant comprising (A) a copolymer of at least one acrylate selected from the group consisting of 2-ethylhexyl acrylate and n-butyl acrylate, and at least one glycidyl monomer, the amount of said glycidyl monomer being 0.5–5 parts by weight to 100 parts by weight of said acrylate, (B) a curing agent for epoxy resin, and (C) a polymer whose solubility parameter to the copolymer is within ±0.5 in an amount up to 200 parts by weight to 100 parts by weight of said copolymer, said cured puncture sealant exhibiting an elongation at break of 500 to 2000% and a tensile strength of 0.7 to 5.0 kg/cm$^2$.

2. The combination of claim 1, in which the amount of said glycidyl monomer is 0.8–3 parts by weight to 100 parts by weight of said acrylate.

3. The combination of claim 1 in which the polymer is a homopolymer or copolymer of at least one member selected from the group consisting of 2-ethylhexyl acrylate, n-butyl acrylate, and ethyl acrylate.

4. The combination of claim 1 in which the polymer is nitrile-butadiene rubber.

5. The combination of claim 1 in which the copolymer (A) contains at least one acrylate other than 2-ethylhexyl acrylate and n-butyl acrylate having no epoxy group as a comonomer.

6. The combination of claim 5 in which said other acrylate is contained in an amount of not more than 25 parts by weight to 100 parts by weight of the total amount of 2-ethylhexyl acrylate and n-butyl acrylate.

7. The combination of claim 5 in which said other acrylate is a member selected from the group consisting of ethyl acrylate and cetyl acrylate.

8. The combination comprising a sealed rubber product and a cured puncture sealant layer on an inner surface of said product, said sealant comprising (A) a copolymer of at least one acrylate selected from the group consisting of 2-ethylhexyl acrylate and n-butyl acrylate, and at least one glycidyl monomer the amount of said glycidyl monomer being 0.5–5 parts by weight to 100 parts by weight of said acrylate, (B) a curing agent for epoxy resin, and (C) a polymer whose solubility parameter to the copolymer is within ±0.5 in an amount up to 200 parts by weight to 100 parts by weight of said copolymer, said cured puncture sealant exhibiting an elongation at break of 500 to 2000% and a tensile strength of 0.7 to 5.0 kg/cm$^2$.

* * * * *